US008731549B2

(12) United States Patent
Sharaga et al.

(10) Patent No.: US 8,731,549 B2
(45) Date of Patent: May 20, 2014

(54) NEIGHBOR LIST BROADCASTING TECHNIQUES

(75) Inventors: Avishay Sharaga, Bet Nehemya (IL); Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 12/914,097

(22) Filed: Oct. 28, 2010

(65) Prior Publication Data

US 2011/0111754 A1 May 12, 2011

Related U.S. Application Data

(60) Provisional application No. 61/259,086, filed on Nov. 6, 2009.

(51) Int. Cl.
*H04W 4/00* (2009.01)
(52) U.S. Cl.
USPC ............................ 455/434; 370/331; 455/435.3
(58) Field of Classification Search
USPC ................. 455/434, 466, 439, 435.2, 435.3; 370/328–331
See application file for complete search history.

(56) References Cited

U.S. PATENT DOCUMENTS

| 2006/0089144 | A1* | 4/2006 | Kim et al. ..................... 455/439 |
| 2008/0242340 | A1 | 10/2008 | Kang et al. |
| 2008/0291875 | A1* | 11/2008 | Kang et al. ..................... 370/331 |
| 2008/0316969 | A1 | 12/2008 | Prakash et al. |
| 2009/0082020 | A1* | 3/2009 | Ch'ng et al. ............... 455/435.3 |
| 2009/0190555 | A1* | 7/2009 | Oguchi .......................... 370/331 |
| 2011/0013588 | A1* | 1/2011 | Jeon et al. ..................... 370/331 |
| 2011/0047029 | A1* | 2/2011 | Nair et al. ................... 705/14.52 |
| 2011/0299502 | A1* | 12/2011 | Jung et al. ..................... 370/331 |

FOREIGN PATENT DOCUMENTS

| CN | 1731882 | 2/2006 |
| WO | 2006019266 | 2/2006 |
| WO | 2008081816 | 7/2008 |
| WO | 2008094333 | 8/2008 |
| WO | 2008147130 | 12/2008 |
| WO | 2009/157643 A2 | 12/2009 |
| WO | 2010/048342 A1 | 4/2010 |

OTHER PUBLICATIONS

Office Action received for Great Britain Patent Application No. 1018699.7, mailed on Mar. 4, 2011, 3 pages.

(Continued)

*Primary Examiner* — Claire X Pappas
*Assistant Examiner* — Ngan Pham Lu
(74) *Attorney, Agent, or Firm* — Kacvinsky Daisak Bluni PLLC

(57) ABSTRACT

Techniques are disclosed that involve the indication of neighbor base stations. For instance, a base station may generate and wirelessly transmit a message that indicates a plurality of neighboring base stations. This message may include an indicator having one or more wildcard values. Through the employment of such wildcard values, the indicator may provide information corresponding to the plurality of neighboring base stations. For instance, the indicator may indicate a plurality of base station identifiers (BSIDs). Alternatively, the indicator may indicate a plurality of preamble indices. As a further alternative, the indicator may indicate a plurality of carrier frequencies. Through the employment of such techniques, overhead can be saved without causing ambiguity in mobility management.

12 Claims, 7 Drawing Sheets

(56) References Cited

OTHER PUBLICATIONS

"IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1", IEEE Computer Society and the IEEE Microwave Theory and Techniques Society, IEEE Std 802.16e™-2005 and IEEE Std 802.16™-2004/Cor1-2005, Feb. 28, 2006, 864 pages.

"IEEE Standard for Local and metropolitan area networks, Part 16: Air Interface for Broadband Wireless Access Systems", IEEE Computer Society and the IEEE Microwave Theory and Techniques Society, IEEE Std 802.16™-2009, May 29, 2009, 2082 pages.

Barber, Phillip et al., "IEEE NBR-ADV Changes—HO Ad-Hoc Consensus", IEEEC802.16.e-14/146, submitted Jun. 25, 2004.

Hyungeong Kang et al., "Scan Report Operation", IEEEC802.16e-04/54r2, May 17, 2004.

Office Action received for Chinese Patent Application No. 201010602673.6, mailed May 31, 2013, 24 pages.

* cited by examiner

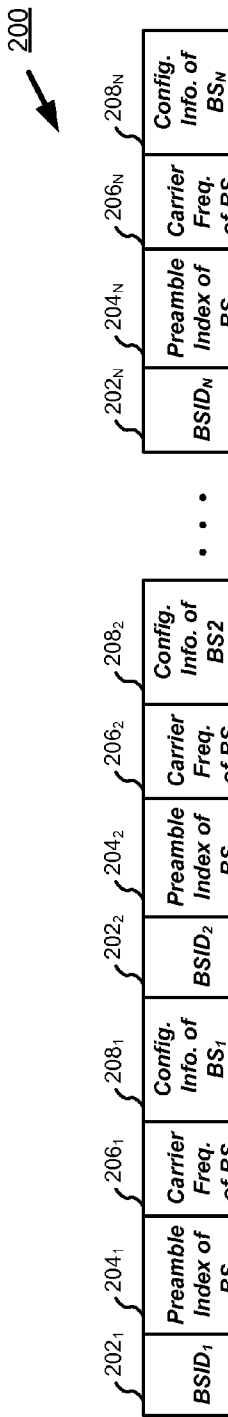
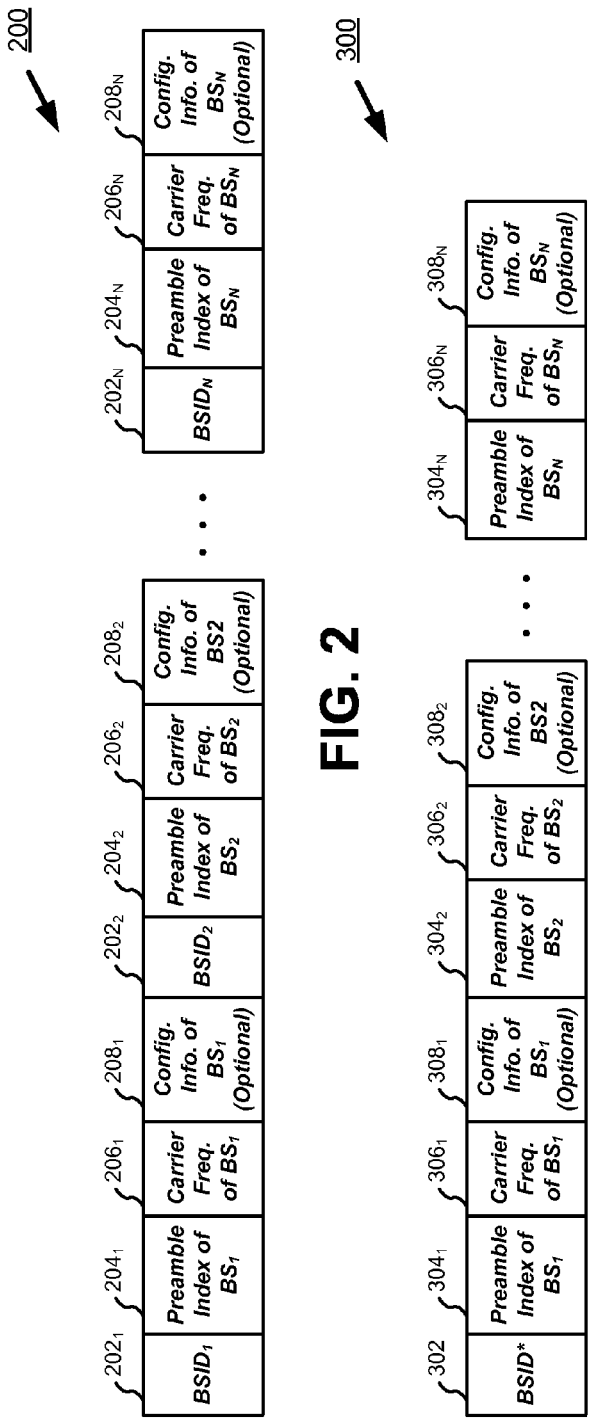
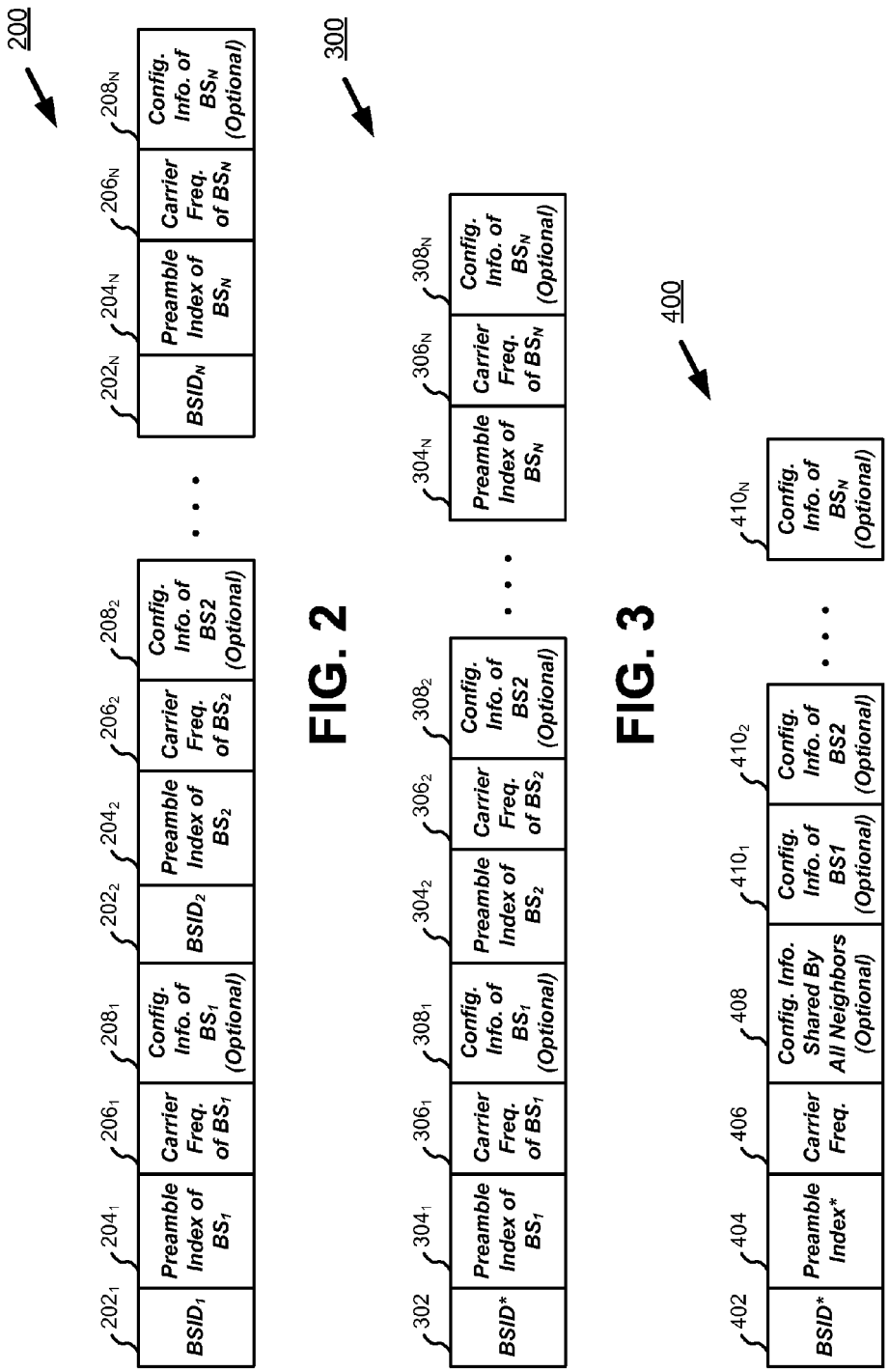

NEIGHBOR LIST BROADCASTING TECHNIQUES

CROSS REFERENCE TO RELATED APPLICATIONS

This application claims priority to U.S. Provisional Application Ser. No. 61/259,086, filed on Nov. 6, 2009. U.S. Provisional Application Ser. No. 61/259,086, filed on Nov. 6, 2009 is incorporated herein by reference in its entirety.

BACKGROUND

Wireless networks commonly employ cellular topologies to provide wireless communications capabilities across large physical areas. Through these topologies, multiple individual cells may provide various advantages. Examples of such advantages include increased communications capacity and reduced transmitter power levels.

Within each cell, a corresponding base station (BS) provides communications access to one or more mobile stations (MSs). During operation, a cell's base station may broadcast a neighbor list. The neighbor list notifies a mobile station (MS) of the neighboring base stations. Thus, through the neighbor list, mobile stations are informed of the network topology. This facilitates mobility management (e.g., handover) between cells.

WiMAX networks are wireless networks that operate in accordance with the Institute of Electrical and Electronics Engineers (IEEE) 802.16 standards. In WiMAX networks, base stations may broadcast neighbor lists in the forms of NBR-ADV messages.

Cellular topologies may employ various arrangements of overlapping cells. For instance, a larger cell (e.g., a macro cell) may encompass many smaller cells (e.g., micro cells pico cells, and/or femto cells). Thus, in such scenarios, a base station may have a large number of neighbors to report. Unfortunately, this causes neighbor list broadcasts to become very large. As a result, excessive communications overhead may be consumed.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 2-4 are diagrams of exemplary neighbor list formats;

DETAILED DESCRIPTION

Embodiments provide techniques that involve the indication of neighbor base stations. For instance, embodiments may generate and wirelessly transmit a message that indicates a plurality of neighboring base stations. This message may include an indicator having one or more wildcard values. Through the employment of such wildcard values, the indicator may provide information corresponding to the plurality of neighboring base stations. For instance, the indicator may indicate a plurality of base station identifiers (BSIDs). Alternatively, the indicator may indicate a plurality of preamble indices. As a further alternative, the indicator may indicate a plurality of carrier frequencies. Through the employment of such techniques, overhead can be saved without causing ambiguity in mobility management. Such techniques may be employed in network that operates in accordance with (partially or wholly) any past, present, or future IEEE 802.16 (WiMAX) standard, or extension thereto. Embodiments, however, are not limited to such networks.

Figure 1:
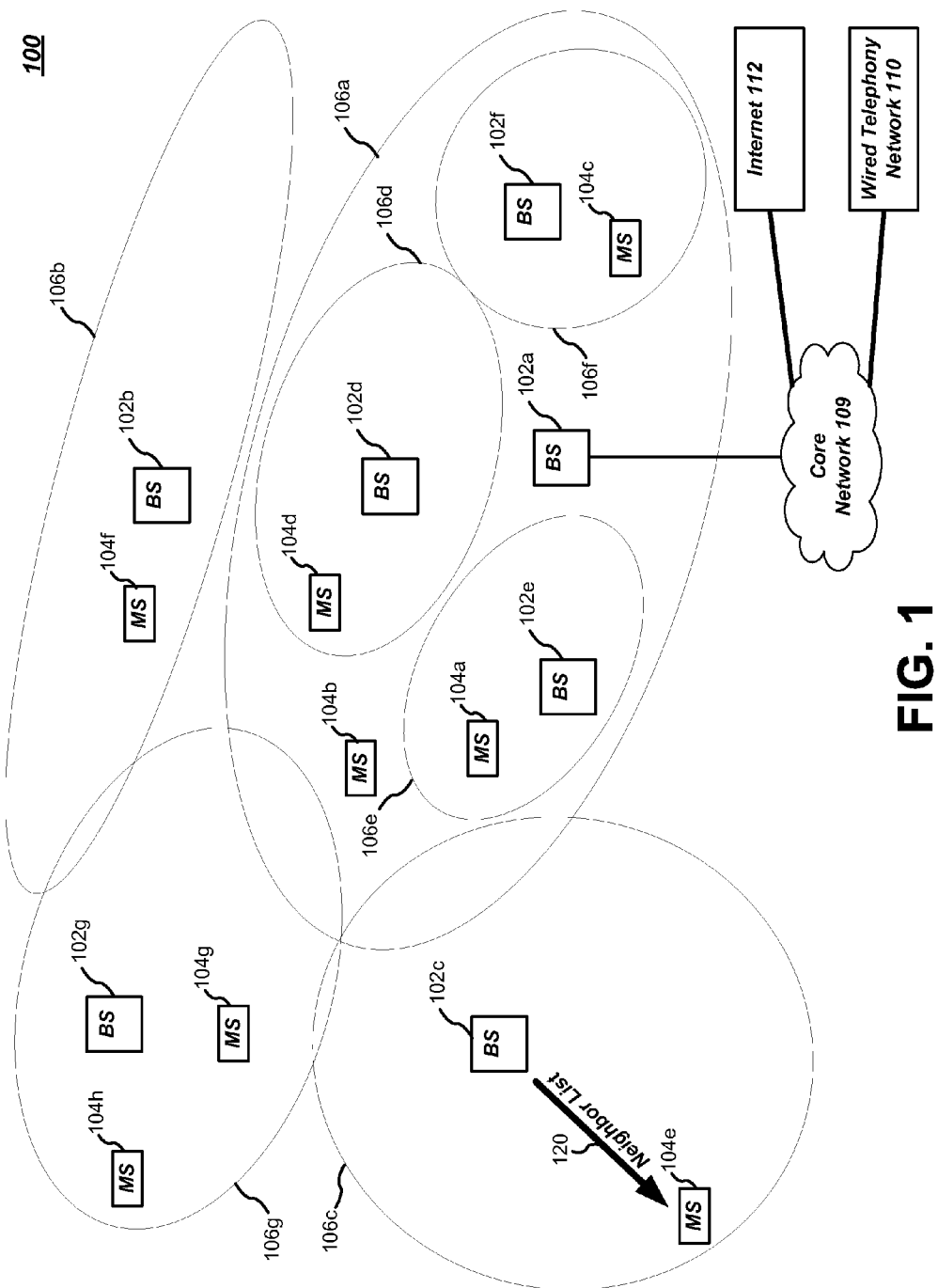
FIG. 1 is a diagram of an exemplary operational environment.

FIG. 1 is a diagram of an exemplary operational environment 100. This environment includes multiple base stations (BSs) 102*a-g*, and multiple mobile stations (MSs) 104*a-h*. BSs 102*a-g* provide corresponding cells 106*a-g*, respectively. As shown in FIG. 1, cells 106*d*, 106*e*, and 106*f* are within cell 106*a*. Accordingly, cell 106*a* may be a macro cell, while each of cells 106*d*, 106*e*, and 106*f* may be a micro, pico, or femto cell.

FIG. 1 shows that MS 104*a* is within cells 106*a* and 106*e*, MS 104*b* is within cell 106*a*, MS 104*c* is within cells 106*f* and 106*a*, MS 104*d* is within cells 106*d* and 106*a*, MS 104*e* is within cell 106*c*, MS 104*f* is within cell 106*b*, MS 104*g* is within cell 106*g*, and MS 104*h* is within cell 106*g*.

Base stations 102*a-g* may provide wireless connectivity to MSs 104*a-h* so that these MSs may communicate with each other, or with any other entity in the network. Also, base stations 102*a-g* may provide connectivity to other networks. For example, FIG. 1 shows base station 102*a* connected to a core network 109. In turn, core network 109 provides MSs 104*a-h* with access to a wired telephony network 110 and to the Internet 112. These connections are provided for purposes of illustration, and not limitation. Thus, other connectivity arrangements may be employed.

The elements of FIG. 1 may operate in accordance with various networking standards. Exemplary standards include (but are not limited to) one or more of the IEEE 802.16 WiMAX standards.

In general operation, BSs 102*a-g* may each broadcast neighbor lists (e.g., NBR-ADV messages). For instance, FIG. 1 shows BS 102*c* broadcasting a neighbor list 120. Neighbor list 120 identifies base stations that are neighbors of BS 102*c*. As an example, neighbor list 120 may identify BSs 102*a*, 102*d*, 102*e*, 102*f*, and 102*g* as being neighbors.

Upon receipt of neighbor list 120, mobile stations within cell 106*c* (e.g., MS 104*e*) may use the information that it contains to perform various operations. Exemplary operations include (but are not limited to) scanning and handover operations.

Currently in IEEE 802.16 (WiMAX) networks, the generation of a neighbor list (e.g., a NBR-ADV message) is managed by a loop of all neighbor base stations. This loop is shown below in Pseudo Code Example 1.

N: number of neighbor base stations
For i = 1:N {
   BSID$_i$;
   Preamble Index of BS$_i$;
   Carrier frequency of BS$_i$;
   Other configuration information for BS$_i$; // optional
}

Pseudo Code Example 1

In Pseudo Code Example 1, N represents the number of neighbor base stations. Thus, for each neighbor base station ($BS_j$), the neighbor list may indicate the neighbor's base station identifier (BSID), and the neighbor's carrier frequency. Also, for each neighbor base station ($BS_j$), the neighbor list may indicate other configuration information of the neighbor.

In IEEE 802.16 networks, the BSID is a 48-bit value that uniquely identifies a base station. Also, in IEEE 802.16 networks, the preamble index is a value (e.g., an integer value) that indicates a predetermined preamble employed by a base station at a particular carrier frequency.

FIG. 2 is a diagram of an exemplary format 200 in accordance with Pseudo Code Example 1. This format may be included in a neighbor list broadcast (e.g., in a NBR-ADV message). As shown in FIG. 2, this format includes information for N neighbor base stations. More particularly, FIG. 2 shows that, for each individual neighbor base station, there is provided a BSID 202 (shown as $202_1$-$202_N$), a preamble 204 (shown as $204_1$-$204_N$), and a carrier frequency 206 (shown as $206_1$-$206_N$). Also, optional configuration information 208 (shown as $208_1$-$208_N$) may be provided for each neighbor base station.

As described above, neighbor lists may become very large. Thus, their transmission may consume excessive communications resources. Embodiments advantageously reduce the size of neighbor lists. For instance, embodiments may broadcast neighbor lists that include only partial information for particular fields. This feature may advantageously conserve overhead without creating ambiguities in mobility management.

As indicated above by Pseudo Code Example 1, the current IEEE 802.16 neighbor list broadcast includes multiple forms of information for each neighbor. However, it is typically not critical to convey this full information in a neighbor list. For instance, when a mobile station performs scanning of neighbor base stations, the preamble index and carrier may be more useful. This is because the mobile station can eventually obtain a corresponding BSID by reading downlink control transmissions of the target BS that it scans at a particular carrier frequency.

Thus, embodiments employ indicators having wildcard values so that an identifier may indicate a group of neighbor base stations. For instance, embodiments may employ such a BSID indicator (referred to herein as "BSID*"). A particular value of BSID* may capture a group of base stations. As a result, the employment of BSID* indicators may advantageously reduce the overhead of neighbor list broadcasts.

As an example, consider a scenario in which three neighbor BSs exist with the following BSIDs (in hexadecimal): 0xFFFFFFFF0001, 0xFFFFFFFF00A5, and 0xFFFFFFFF0A02. These BSID values can be abstracted into a BSID* of 0xFFFFFFFF0***. In this BSID*, the asterisks represent "wildcard" or "don't care" values. Thus, this BSID* encodes a range that covers each of the three BSIDs.

A neighbor list employing a BSID* covering multiple neighbor base stations is listed below in Pseudo Code Example 2.

```
N: number of neighbor base stations
BSID*;
For i = 1:N {
    Preamble index of BS_i;
    Carrier frequency for BS_i;
    Configuration information for BS_i; // optional
}
```

Pseudo Code Example 2

According to this pseudo code, a neighbor list broadcast includes a BSID*. This BSID* may include wildcard value(s) so that it covers multiple (N) neighbor base stations. In contrast, this neighbor list includes an individual preamble index for each of the N neighbor base stations. Also, this neighbor list may include configuration information for each of the individual neighbor base stations.

FIG. 3 is a diagram of an exemplary format 300 in accordance with Pseudo Code Example 2. This format may be included in a neighbor list broadcast (e.g., in a NBR-ADV message). As shown in FIG. 3, this format includes information for N neighbor base stations. More particularly, FIG. 3 shows that there is provided a BSID* 302 covering all N neighbor base stations. Further for each individual neighbor base station, there is provided a preamble index 304 (shown as $304_1$-$304_N$), and a carrier frequency 306 (shown as $306_1$-$306_N$). Also, optional configuration information 308 (shown as $308_1$-$308_N$) may be provided for each individual neighbor base station.

The format of FIG. 3 provides information for a set of N neighbor base stations. In embodiments, this format may be repeated for additional sets of base stations. Thus, a neighbor list may advertise multiple sets of neighbor base stations, where each set indicated by a corresponding BSID*.

Upon receiving such a neighbor list, an MS may scan for neighbor base stations and determine their BSIDs (e.g., after first identifying the base stations from the preamble indices advertised in the neighbor list). If a BSID value falls into the range covered by the broadcasted BSID*, the MS regards the corresponding base station as an advertised neighbor. Thus, in embodiments, the MS may consider this base station as a recommended potential target base station for handover.

Thus, a BSID* may be employed in combination with preamble indices. For instance, in Pseudo Code Example 2 (provided above), a neighbor list includes a BSID* (covering one or more neighbor base stations), as well as individual preamble indices for each of multiple neighbor base stations.

However, in dense deployments having many small cells, it may be too expensive to broadcast a preamble index for each individual neighbor. Thus, embodiments may employ a preamble index indicator having one or more wildcard values to indicate multiple preamble indices.

For example, embodiments may employ such a preamble index indicator (referred to herein as "Preamble-Index*"). A particular value of Preamble-Index* may capture multiple preamble indices. As a result, the employment of Preamble-Index* may advantageously reduce the overhead of neighbor list broadcasts.

A neighbor list employing a wildcard BSID* and a Preamble-Index* is listed below in Pseudo Code Example 3.

```
N: number of neighbor base stations
BSID*;
Preamble-Index*
Carrier frequency;
Configuration information shared by all neighbors; // optional
```

-continued

```
For i = 1:N {
    Configuration information for BS_i; // optional
}
```

Pseudo Code Example 3

As shown in Pseudo Code Example 3, the SBS may use a BSID* and a Preamble-Index* to indicate a group of neighbor base stations at a specific carrier frequency. Alternatively, instead of indicating a specific carrier frequency that is associated with BSID* and Preamble-Index*, a carrier frequency indicator having one or more wildcard values (a carrier-frequency* indicator) may be used to cover multiple carrier frequencies (e.g., a range of carrier frequencies). In Pseudo Code Example 3, preamble-Index* may cover multiple preamble indices by indicating a range of preamble index values used by neighbor base stations.

Thus, embodiments may use a single neighbor list entry to represent a group of neighbor base stations. This single entry may include various forms of compressed information. For example, this compressed information may include a BSID* indicator, a Preamble-Index* indicator, a carrier frequency indicator, and/or a carrier-frequency* indicator.

Further, a neighbor list generated in accordance with Pseudo Code Example 3 may include configuration information. Such configuration information may include information that is shared by all of the neighbors in the neighbor list. Also, such configuration information may include one or more items of information, where each item of information pertains to an individual neighbor in the neighbor list.

Such "compressed" information is sufficient to help a mobile station perform efficient scanning. Based on this scanning, the mobile station can obtain more system configuration information directly from a neighbor base station's downlink control channel (if needed).

FIG. 4 is a diagram of an exemplary format 400 in accordance with Pseudo Code Example 3. This format may be included in a neighbor list broadcast (e.g., in a NBR-ADV message). As shown in FIG. 4, this format includes information for N neighbor base stations. More particularly, FIG. 4 shows that, covering all N neighbor base stations, there is provided a BSID* 402, a preamble index* 404, and a carrier frequency 406 (or alternatively, a carrier-frequency* indicator). Also, there may be provided configuration information 408 shared all N neighbor base stations. Further for each individual neighbor base station, there may be provided configuration information 410 (shown as $410_1$-$410_N$ The format of FIG. 4 provides information for a set of N neighbor base stations. In embodiments, this format may be repeated for additional sets of base stations. Thus, a neighbor list may advertise multiple sets of neighbor base stations, where each set indicated by corresponding BSID*, Preamble-Index*, and carrier frequency (or carrier-frequency*) values.

Embodiments may employ indicators having wildcards in other ways. For instance, a serving base station (SBS) may use a BSID* to command a mobile station to scan for a group of base stations. This may be done, for example, when the SBS is not sure which neighbor base station is the best handover candidate for a mobile station.

Thus, by replacing BSID digit values (e.g., binary digit values, hexadecimal digit values, etc.) with wildcard values, embodiments may advantageously reduce overhead that is associated with MAC control signaling messages. Such overhead reductions may be significant in dense deployments, such as ones employing macrocells, femtocells, and/or picocells.

The above examples are provided for purposes of illustration and not limitation. Thus, embodiments may employ wildcard encoding formats to compress other forms of information. For instance, a carrier frequency indicator may indicate multiple carrier frequencies through the employment of wildcard value(s).

As an example, a network operator may provide multiple base stations that employ a set of carrier frequencies. In this example, the set of carrier frequencies is represented by a network-wide indexing scheme in which a one-to-one correspondence exists between index values and carrier frequencies. When a group of base stations (e.g., base stations of a particular cell type) are deployed on a subset of these carrier frequencies, a carrier frequency indicator having wildcard values may be employed to cover this subset. For instance, such an indicator may encode a range of carrier frequencies. This may advantageously facilitate mobile station scanning.

As described herein, a serving base station may broadcast a neighbor list. Upon receipt, a mobile station may perform scanning operations of the neighbor base station(s) that are indicated in the neighbor list. In turn, the mobile station may respond by transmitting a scanning report to the serving base station. The scanning report includes a measurement report for each of the one or more neighbor base stations.

When a compressed neighbor list is employed (e.g., neighbor lists in the formats of Pseudo Code Example 2 and Pseudo Code Example 3), corresponding scanning report(s) must ensure there is no ambiguity in terms of which base station is associated with a particular measurement report. This is so the serving base station can make proper handover decisions, etc.

Such ambiguities may arise if measurement reports employ compressed indicators (e.g., BSID*, Preamble-Index*, etc.). This is because when compressed neighbor lists are employed, a mobile station may only have information (e.g., BSIDs, preamble indexes, etc.) of a subset of neighbors—even after scanning. This is in contrast to the serving base station, which has full information (e.g., BSIDs, preamble indexes, etc.) of all of its neighbor base stations.

The employment of other forms of indicators in measurement reports may also be ambiguous. For example, an order index of a target BS in the neighbor may not be feasible. This is because a mobile station may not be able to infer the order index of a particular BS from a compressed neighbor list. The preamble index may also cause confusion if it is used as identification for scanning report. This is because preamble indices may be reused (spatially). For example two femtocells may have the same preamble index, while under the coverage of the same macrocell.

Accordingly, to eliminate the potential for any ambiguity, embodiments employ measurement reports that include full BSID values (e.g., BSID values without wildcard values).

Figure 5A:
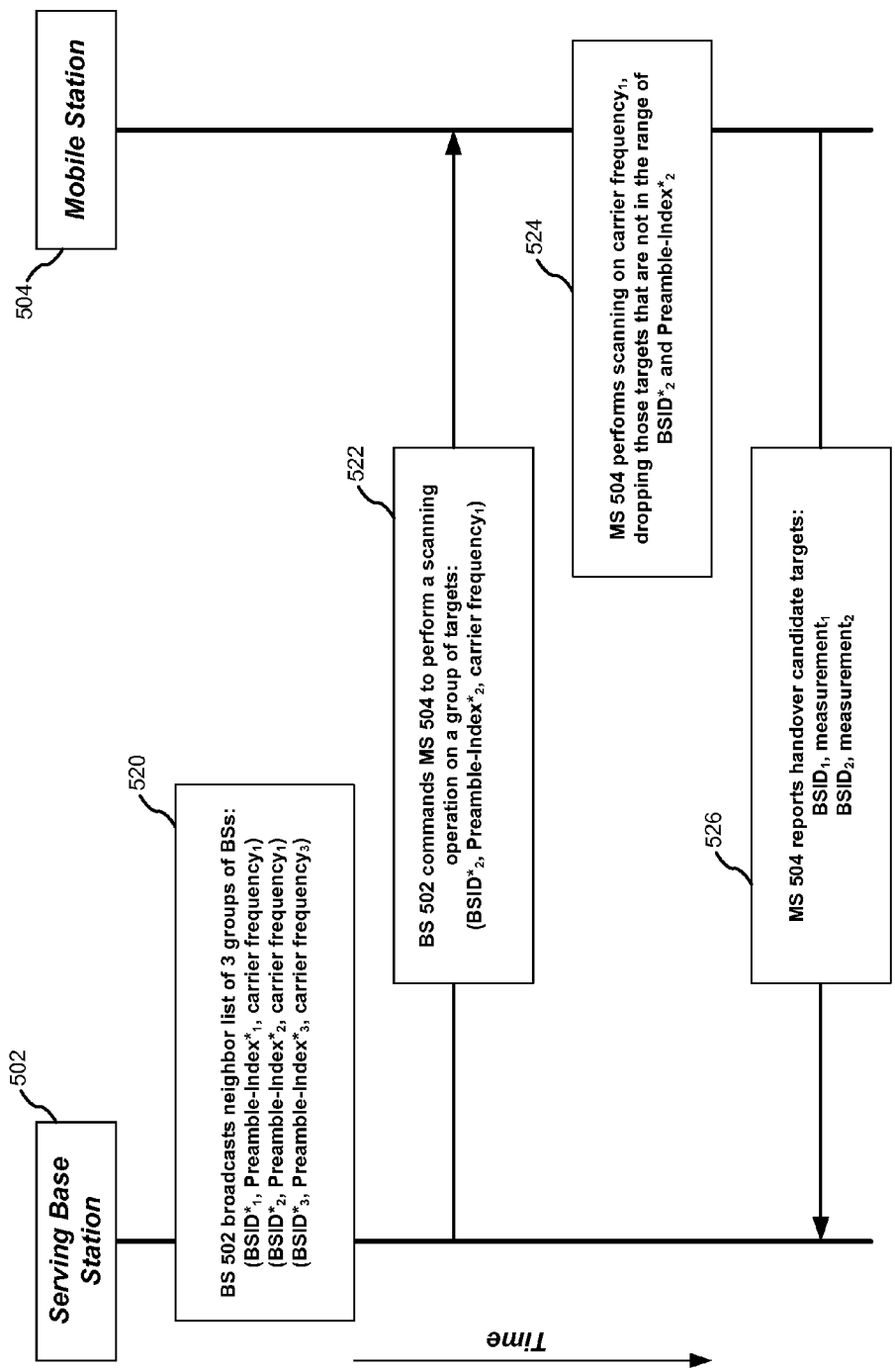
FIGS. 5A and 5B are diagrams showing exemplary interactions between a base station and a mobile device.
Figure 5B:
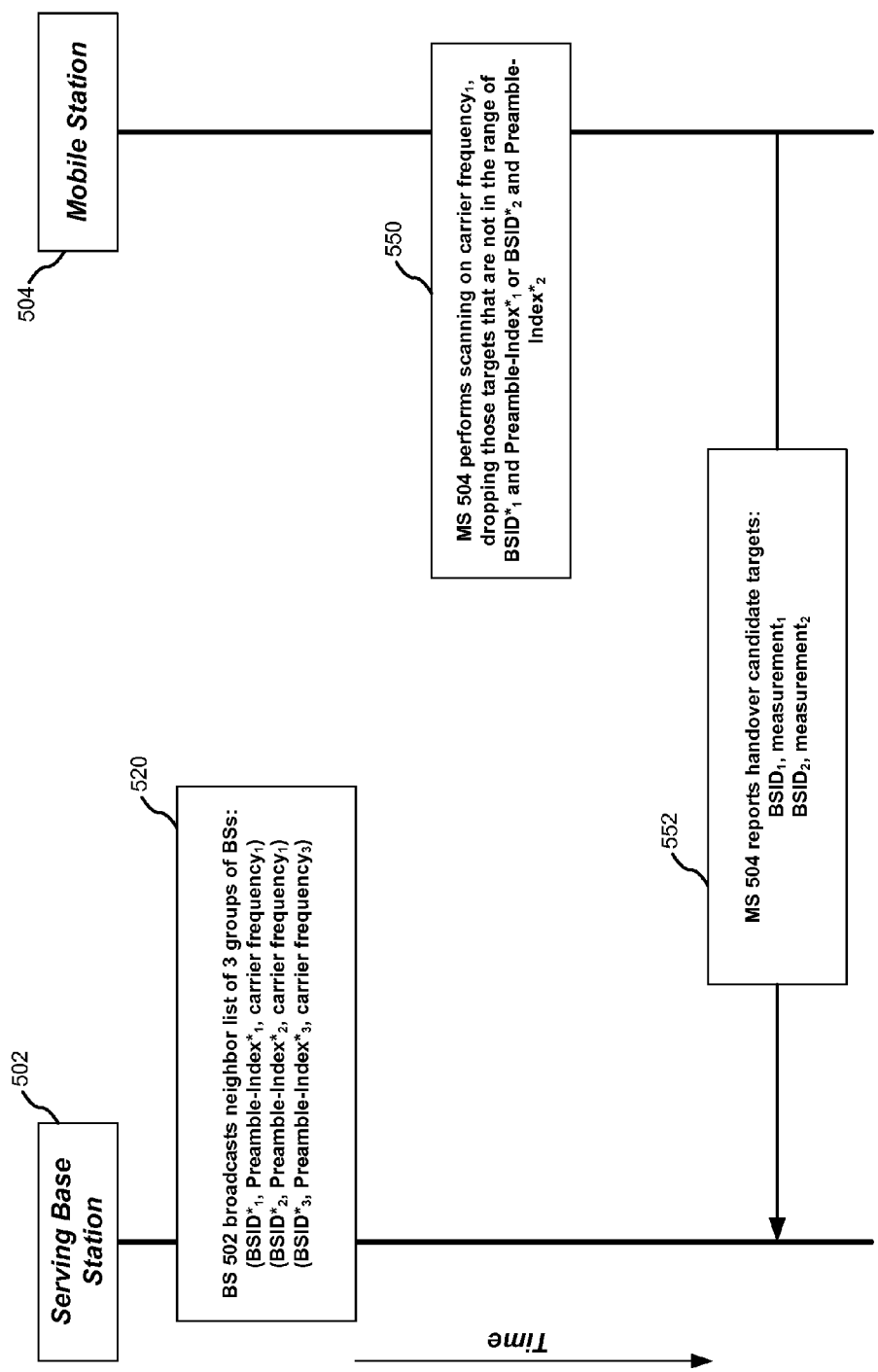

FIGS. 5A and 5B are diagrams of exemplary interactions between a serving base station 502 and a mobile station 504. More particularly, these diagrams provide examples of neighbor list broadcast and scanning procedures.

As shown in FIG. 5A, serving base station 502 broadcasts a neighbor list at a block 520. This neighbor list advertises three groups of neighbor base stations. More particularly, the neighbor list advertises: a first group covered by $BSID^*_1$, $Preamble\text{-}Index^*_1$, and $carrier\ frequency_1$; a second group covered by $BSID^*_2$, $Preamble\text{-}Index^*_2$, and $carrier\ frequency_1$; and a third group covered by $BSID^*_3$, Preamble- Index*$_3$, and carrier frequency$_3$. Thus, in embodiments, this neighbor list may employ the format of FIG. 4.

FIG. 5A further shows that (at a block 522) serving base station 502 sends a command to mobile station 504. This command instructs mobile station 504 to perform a scanning operation on a group of target base stations. As shown in FIG. 5A, this group of target base stations is indicated by BSID*$_2$, Preamble-Index*$_2$, and carrier frequency$_1$.

Upon receipt of this command, mobile station 504 (at a block 524) performs a scanning operation at carrier frequency$_1$, dropping those targets that are not covered by BSID*$_2$ and preamble index*$_2$.

Following this scanning operation, mobile station 504 (at a block 526) sends a scanning report to base station 502. FIG. 5A shows that this scanning report includes measurements for two neighbor base stations (i.e., measurement$_1$ for BSID$_1$, and measurement$_2$ for BSID$_2$). As indicated above, these scanning reports do not employ BSID*. Instead regular BSID values are employed for each of the neighbor base stations.

The interactions in FIG. 5B are similar to the ones in FIG. 5A. However, in FIG. 5B, scanning is initiated by mobile station 504. More particularly, blocks 522, 524, and 526 are replaced with block 550 and 552.

At block 550, mobile station 504 performs a scanning based on the neighbor list that was broadcasted at block 520. In particular, mobile station 504 performs scanning at carrier frequency$_1$. During this scanning, mobile station 504 drops those targets that are not covered by the broadcasted neighbor list at carrier frequency$_1$ (i.e., BSID*2 and preamble index*2).

Following this scanning operation, mobile station 504 (at block 552) sends a scanning report to base station 502. FIG. 5B shows that this scanning report includes measurements for two neighbor base stations (i.e., measurement$_1$ for BSID$_1$, and measurement$_2$ for BSID$_2$). In this example, these neighbor base stations are covered by the neighbor list broadcast sent at block 520 (more specifically within carrier frequency$_1$). As indicated above, these scanning reports do not employ BSID*. Instead regular BSID values are employed for each of the neighbor base stations.

As described above, wildcard techniques may be employed to cover multiple values. For example, techniques may indicate a common prefix such as BSID*=0xFFFFFFFF0***. Also, techniques may indicate a common suffix, such as BSID*=0x***FFFFFFFF0. Further, techniques may indicate a general range, such as BSID*=0xFFFF***FFFF0.

Figure 6:
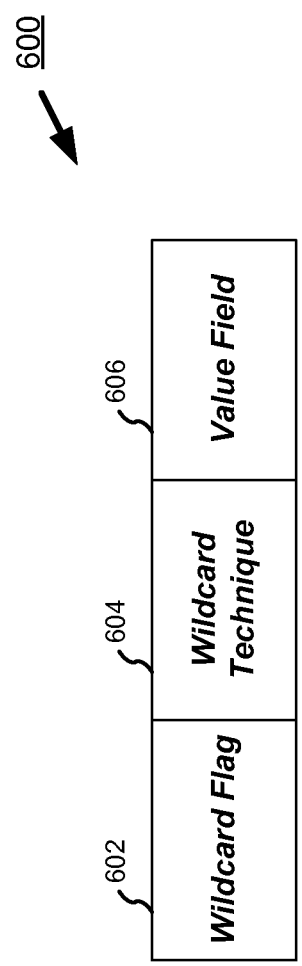
FIG. 6 is a diagram of an exemplary wildcard encoding technique.

Such techniques may be formatted in various ways. FIG. 6 is a diagram showing an exemplary format 600 for a wildcard encoding technique. This format may be employed in a neighbor list, such as an IEEE 802.16 NBR-ADV.

As shown in FIG. 6, format 600 includes a wildcard flag parameter 602. This parameter indicates whether a "wildcarded" indicator covering multiple values (e.g., multiple BSIDs or multiple preamble indices) is being employed, or whether a conventional indicator specifying a single value (e.g., a single BSID or a single preamble index) is being employed.

A wildcard technique parameter 604 indicates which of multiple encoding techniques is employed. For instance, parameter 604 may indicate whether a common prefix, a common suffix or a range is encoded.

A field 606 indicates a value in accordance with the technique indicated by parameter 604. For instance, when parameter 604 indicates employment of a common prefix, then field 606 indicates the length and value of the prefix. However, when parameter 604 indicates employment of a common suffix, then field 606 indicates the length and value of the suffix. Alternatively, when parameter 604 indicates employment of a range, then field 606 indicates a start value and an end value.

Additionally or alternatively, wildcard values may be formatted with fixed-length strings. For example, fixed-length symbols (e.g. 8-bit characters) may encode each digit in a hexadecimal field. For instance, a string of characters may indicate a hexadecimal-based value having special character (s) (e.g., 'X') to represent wildcards. For example, in the string "XFFFXXFFFF10", each 'X' represents a wildcard value.

Figure 7:
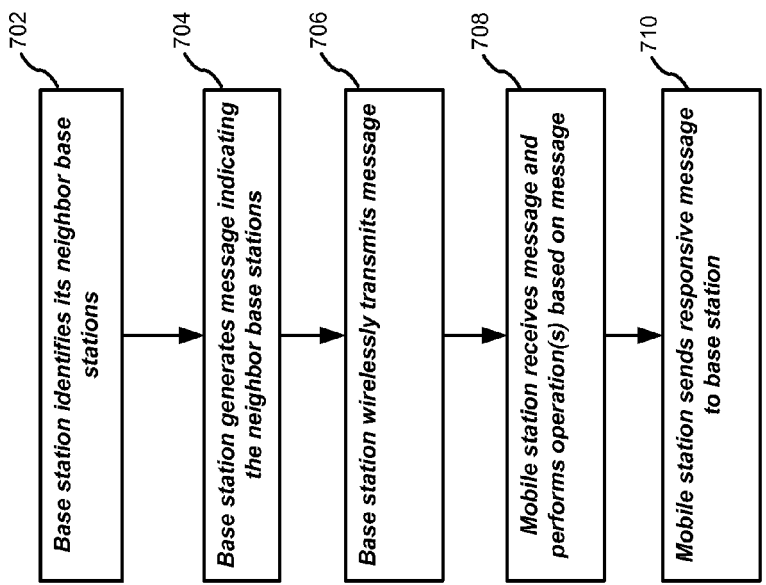
FIG. 7 is a logic flow diagram.

FIG. 7 illustrates an exemplary logic flow 700, which may be representative of operations executed by one or more embodiments described herein. Thus, this flow may be employed in the contexts of FIG. 1. Embodiments, however, are not limited to this context. Also, although FIG. 7 shows particular sequences, other sequences may be employed. Moreover, the depicted operations may be performed in various parallel and/or sequential combinations.

At a block 702, a base station identifies its neighbor base stations. This may be performed through various techniques, such as the exchange of control messages the performance of various management protocols, and so forth.

Based on this identification, the base station (at a block 704) generates a message that indicates the multiple base stations. This message may be, for example, a neighbor list (e.g., NBR-ADV) message, a scanning command message, as well as other types of messages. In this message, the indication of multiple base stations may be in accordance with the techniques (e.g., wildcard-based techniques) described herein. Then, at a block 706, the base station wirelessly transmits the message.

At a block 708, a mobile station (e.g., a mobile station served by the base station) receives the message. In turn, the mobile station may perform operations based on this message. Exemplary operations include (but are not limited to) storing/updating the neighbor list, performing scanning operations (e.g., as directed by the base station), and so forth.

As indicated by a block 710, the mobile station may send a responsive message to the base station. For example, the mobile station may send a scanning report message. Such a message may include measurement reports that unambiguously indicate neighbor base stations. For example, such measurement reports may include BSID indicators.

Figure 8:
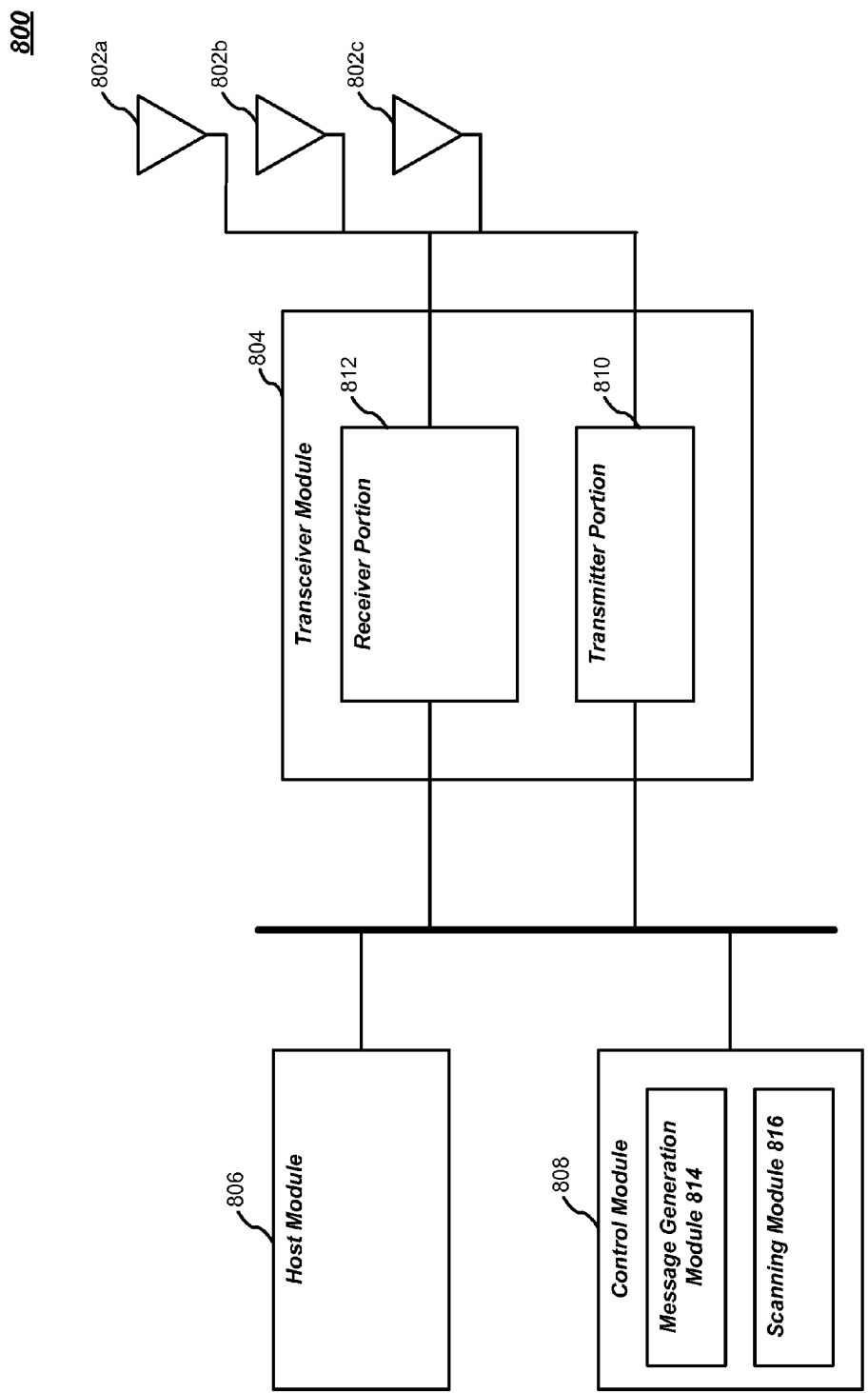
FIG. 8 is a diagram showing an exemplary implementation within a wireless device.

FIG. 8 is a diagram of an implementation 800 that may be included in a wireless device, such as a base station (e.g., any of BSs 102a-g) and/or a mobile station (e.g., any of MSs 104a-h). Implementation 800 may include various elements. For example, FIG. 8 shows implementation 800 including multiple antennas 802a-c, a transceiver module 804, a host module 806, and a control module 808. These elements may be implemented in hardware, software, or any combination thereof.

Antennas 802a-c provide for the exchange of wireless signals with remote devices. Although three antennas are depicted, any number of antennas (e.g., one or more) may be employed. Also, embodiments may employ one or more transmit antennas and one or more receive antennas. Such multiple antenna arrangements may be employed for beamforming and/or the employment of multiple spatial streams with a remote device.

Transceiver module 804 provides for the exchange of information with other devices. As shown in FIG. 8, transceiver module 804 includes a transmitter portion 810, and a receiver portion 812. During operation, transceiver module 804 provides an interface between antennas 802a-c and other elements, such as host module 806, and control module 808.

For instance, transmitter portion 810 receives symbols from such elements, and generates corresponding signals for wireless transmission by one or more of antennas 802a-c. This may involve operations, such as modulation, amplification, and/or filtering. However, other operations may be employed.

Conversely, receiver portion 812 obtains signals received by one or more of antennas 802a-c and generates corresponding symbols. In turn, these symbols may be provided to elements, such as host module 806 and control module 808. This generation of symbols may involve operations, including (but not limited to) demodulation, amplification, and/or filtering.

The signals generated and received by transceiver module 804 may be in various formats. For instance, these signals may be modulated in accordance with an orthogonal frequency division multiplexing (OFDM) based scheme, such as orthogonal frequency division multiple access (OFDMA). However, other schemes and formats (e.g., QPSK, BPSK, FSK, etc.) may be employed.

To provide such features, transmitter portion 810 and receiver portion 812 may each include various components, such as modulators, demodulators, amplifiers, filters, buffers, upconverters, and/or downconverters. Such components may be implemented in hardware (e.g., electronics), software, or any combination thereof.

The symbols exchanged between transceiver module 804 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 804 may employ various access techniques. For example, transceiver module 804 may employ a duplexing technique, such as time division duplexing (TDD), frequency division duplexing (FDD), and so forth. Embodiments, however, are not limited to such techniques.

In embodiments, control module 808 may perform various operations described herein. For instance, FIG. 8 shows control module 808 including a message generation module 814 that may generate various messages. Exemplary messages include neighbor list (e.g., NBR-ADV) messages, scanning command messages, and scanning report messages, as described herein. In addition, FIG. 8 shows control module 808 including a scanning module 816. Scanning module 816 may be employed (e.g., in mobile station implementations) to scan and measure neighboring base stations (e.g., neighboring base stations indicated by a serving base station).

The performance of such operations involves control module 808 exchanging information and/or signals with transceiver module 804. Such information may be in the form of messages exchanged with remote devices (e.g., BSs and/or MSs) as well as information received from BSs that is used in the generation of measurements and scanning reports.

Host module 806 may exchange symbols with transceiver module 804 that correspond to wireless signals exchanged with remote devices. These symbols may form messages or information associated with one or more protocols, and/or one or more user applications. Thus, host module 806 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, embodiments are not limited to contexts involving IEEE 802.16 networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method in a wireless communications network, comprising:

generating a message, the message indicating a plurality of neighboring base stations; and wirelessly transmitting the message;
wherein the message comprises a base station identifier (BSID) indicator indicating a plurality of BSIDs and a preamble indicator indicating a plurality of preamble indices, the BSID indicator and the preamble indicator each comprising one or more wildcard values, the BSID indicator comprising an abstraction of information corresponding to each of the plurality of neighboring base stations that represents a set comprising each of the plurality of neighboring base stations, wherein the message comprises a carrier frequency indicator.

2. The method of claim 1, wherein the carrier frequency indicator indicates a plurality of carrier frequencies.

3. The method of claim 1, wherein the message is a neighbor list broadcast message.

4. The method of claim 1, wherein the message is a scanning command directed to a mobile station.

5. The method of claim 1, further comprising receiving a scanning report message from the mobile station, the scanning report message including a measurement report for each of the plurality of neighbor base stations, wherein each measurement report includes an indicator to identify a single corresponding neighbor base station.

6. The method of claim 5, wherein the identifier in each of the measurement reports is a base station identifier (BSID) value.

7. The method of claim 1, wherein the network is an IEEE 802.16 network.

8. An apparatus, comprising:
a message generation module to generate a message indicating a plurality of neighboring base stations; and
a transceiver to wirelessly transmitting the message;
wherein the message comprises a base station identifier (BSID) indicator indicating a plurality of BSIDs and a preamble indicator indicating a plurality of preamble indices, the BSID indicator and the preamble indicator each comprising one or more wildcard values, the BSID indicator comprising an abstraction of information corresponding to each of the plurality of neighboring base stations that represents a set comprising each of the plurality of neighboring base stations, wherein the message comprises a carrier frequency indicator.

9. The apparatus of claim 8, wherein the carrier frequency indicator indicates a plurality of carrier frequencies.

10. An apparatus, comprising:
a transceiver to receive a wireless message, the message comprising a base station identifier (BSID) indicator indicating a plurality of BSIDs and a preamble indicator indicating a plurality of preamble indices, the BSID indicator and the preamble indicator each comprising one or more wildcard values, the BSID indicator comprising an abstraction of information corresponding to each of the plurality of neighboring base stations that represents a set comprising each of the plurality of neighboring base stations, wherein the message comprises a carrier frequency indicator; and
a scanning module to scan for the plurality of neighboring base stations.

11. The apparatus of claim 10, further comprising a report generation module to generate a scanning report message; wherein the scanning report message includes an individual base station identifier (BSID) for each of the plurality of neighboring base stations.

12. An article, comprising a non-transitory machine-readable storage medium storing instructions that, if executed by a computer, cause the computer to:
generate a message, the message indicating a plurality of neighboring base stations; and
wirelessly transmit the message;
wherein the message comprises a base station identifier (BSID) indicator indicating a plurality of BSIDs and a preamble indicator indicating a plurality of preamble indices, the BSID indicator and the preamble indicator each comprising one or more wildcard values, the BSID indicator comprising an abstraction of information corresponding to each of the plurality of neighboring base stations that represents a set comprising each of the plurality of neighboring base stations, wherein the message comprises a carrier frequency indicator.

* * * * *